Patented June 19, 1934

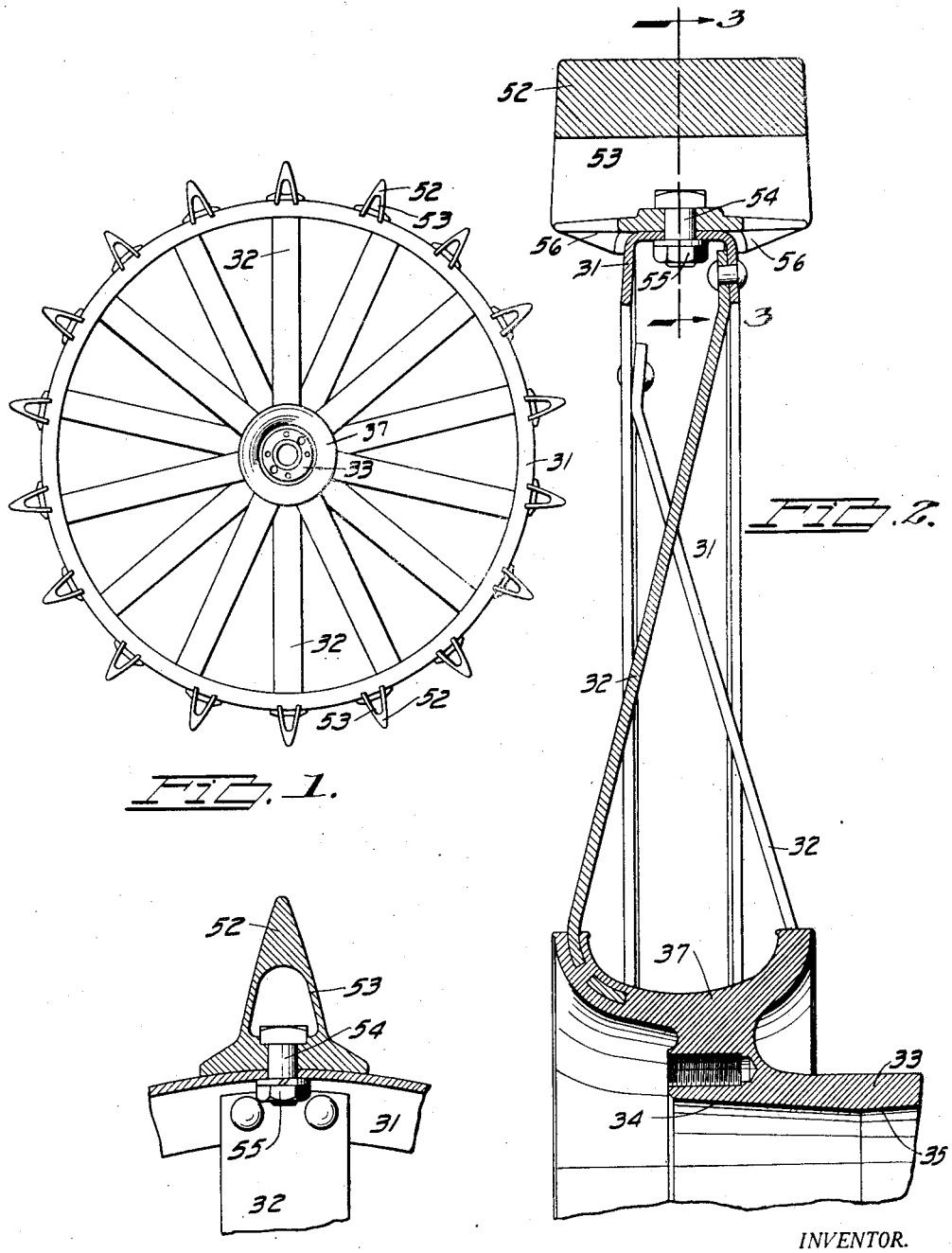

UNITED STATES PATENT OFFICE 1,963,686

TRACTOR WHEEL SPADE

Howard W. Simpson, Dearborn, Mich., assignor to Ford Motor Company, Dearborn, Mich., a corporation of Delaware Application June 10, 1931, Serial No. 543,417

1 Claim. (Cl. 97—215)

The object of my invention is to provide a novel tractor drive wheel which will have detachably secured thereto, traction producing lugs whereby the soil operated upon will be spaded up by the action of these lugs to more thoroughly assist in the cultivation of the ground.

Still a further object of my invention is to provide an axle shaft extension which when used in conjunction with my improved tractor wheel will make available four different wheel widths or treads so that the wheel spacing may be chosen to accommodate the rows ordinarily used in planting the different crops.

With these and other objects in view, my invention consists in the arrangement, construction and combination of the various parts of my improved device, as described in the specification, claimed in my claim, and illustrated in the accompanying drawing, in which:

Figure 1 shows a side view of one of my rear tractor drive wheels.

Figure 2 shows an enlarged vertical central sectional view through the tractor wheel, shown in Figure 1.

Figure 3 shows a sectional view, taken on the line 3—3 of Figure 2.

Referring now to the driving wheel portion of the attachment, it will be seen that these wheels are so constructed that they offer a minimum of flat rolling surface and a maximum traction producing surface. Each of these wheels consists of a channel shaped rim member 31 having inwardly extending ribs formed therearound to which flat steel spokes 32 are riveted. It will be noted that this channel is exceptionally narrow whereby a very narrow track of ground over which the wheel rolls will be compressed. The inner ends of each of the spokes 32 are cast permanently with an annular flange 37 so that a comparatively strong and light wheel structure results. A novel feature of this wheel is that I have provided a sleeve-like hub member 33 for my wheel, one end of which is cast integrally with the center portion of the flange 37 so that all of the hub is disposed on one side of the central plane of the wheel. This hub member has a pair of tapered bores 34 and 35 therein, each of which extends from the center of the hub outwardly to one end thereof. The bore adjacent to the flange 37 is designated by numeral 34, while the bore in the outer end of the hub is numbered 35.

It is desirable to use the same means for securing the hub to the wheel shaft as has been used for a number of years on the Fordson tractor. This means, in general, comprises a tapered split sleeve which is provided with a splined bore which bore coacts with splines on the wheel shaft. The sleeve is adapted to be drawn up into the tapers 34 or 35 attached so as to fixedly secure the hub to the wheel shaft.

It will be noted from Figures 2 and 3 that I have provided a plurality of wheel spades secured around the periphery of the wheel rim 31, which spades are believed to be of novel construction. Each of these spades consists of a wedge-shaped casting 52 having a transverse cored opening 53 extending therethrough. The thick end of the wedge is cast to an arcuate form to conform to the periphery of the rim 31. In order to attach the spade on the rim, a single bolt 54 is inserted through the cored opening 53 to a position adjacent to the center of the spade and extends down through a suitable opening in the arcuate face of the spade and the adjacent portion of the wheel rim where it is secured thereto by a suitable nut 55. As will be noted from Figure 2, a pair of lugs 56 project downwardly from the spade on each side of the rim to thereby prevent lateral displacement of the spade. The single bolt 54 may thereby effectively secure the spade to the wheel rim. Inasmuch as the spade is materially wider than the wheel rim and being of a wedge-shaped form is thus allowed to enter the ground and spade up the soil in a very efficient manner.

Some changes may be made in the arrangement, construction and combination of the various parts of my improved device without departing from the spirit of my invention, and it is my intention to cover by my claim such changes as may reasonably be included within the scope thereof.

I claim as my invention:

A quickly detachable tractor wheel spade comprising, a sharply pointed wedge-shaped member having a width materially greater than the width of the wheel rim adapted to extend across said rim, so as to project a substantial distance from each side thereof, said wedge-shaped member having an integral base portion arcuately shaped to correspond to the periphery of the wheel rim, said base portion being substantially twice the circumferential length of the base of said wedge, so as to extend a substantial distance circumferentially beyond each corner of the base of said wedge member, said wedge and base portion having an opening extending therethrough, a bolt projecting through said rim and base portion into said opening whereby the member is secured to said rim, and a pair of lugs projecting inwardly from said base portion on each side of said rim to thereby prevent lateral displacement of the spade, said base portion substantially reducing the tensile stress upon said retaining bolt due to bending loads upon the spade, without retarding the penetration of said spade into the ground.

HOWARD W. SIMPSON.